US012401251B2

(12) United States Patent
Battistella et al.

(10) Patent No.: US 12,401,251 B2
(45) Date of Patent: Aug. 26, 2025

(54) END CAP FOR ELECTRIC MOTORS, AND MOTOR UNIT COMPRISING AN ELECTRIC MOTOR ASSOCIATED WITH SAID END CAP

(71) Applicant: AMER S.P.A., Valdagno (IT)

(72) Inventors: Francesco Battistella, Valdagno (IT); Mirko Dalla Costa, Schio (IT)

(73) Assignee: Amer S.P.A., Valdagno (IT)

( * ) Notice: Subject to any disclaimer, the term of this patent is extended or adjusted under 35 U.S.C. 154(b) by 135 days.

(21) Appl. No.: 18/256,718

(22) PCT Filed: Jan. 28, 2022

(86) PCT No.: PCT/IB2022/050749
§ 371 (c)(1),
(2) Date: Jun. 9, 2023

(87) PCT Pub. No.: WO2022/162599
PCT Pub. Date: Aug. 4, 2022

(65) Prior Publication Data
US 2024/0048017 A1    Feb. 8, 2024

(30) Foreign Application Priority Data
Jan. 29, 2021   (IT) .................. 102021000001841

(51) Int. Cl.
*H02K 5/06*   (2006.01)
*H02K 5/15*   (2006.01)
(Continued)

(52) U.S. Cl.
CPC ................. *H02K 5/15* (2013.01); *H02K 5/06* (2013.01); *H02K 5/18* (2013.01); *H02K 5/225* (2013.01); *H02K 11/33* (2016.01)

(58) Field of Classification Search
CPC .. H02K 5/06; H02K 5/15; H02K 5/18; H02K 5/20; H02K 5/207; H02K 5/225;
(Continued)

(56) References Cited

U.S. PATENT DOCUMENTS 6,205,644 B1    3/2001   Daniels et al.
2003/0127921 A1  7/2003   Akutsu et al.
(Continued)

FOREIGN PATENT DOCUMENTS

CN   10 446 7298 A   3/2015
CN   205141934 U     4/2016
(Continued)

OTHER PUBLICATIONS

Brodner, Machine Translation of WO2023156150, Aug. 2023 (Year: 2023).*

(Continued)

*Primary Examiner* — Eric Johnson
(74) *Attorney, Agent, or Firm* — Workman Nydegger

(57) ABSTRACT

An end cap for electric motors, preferably for brushless motors, configured to be associated with one of such electric motors at the axial end opposite the output end of the motor shaft. The end cap is made as a single body and comprises a coupling seat for association with the electric motor in the axial direction and a housing for an electronic control unit, wherein such a housing extends from a perimeter portion of the coupling seat, in the axial direction and in the coupling direction of the coupling seat with the electric motor.

17 Claims, 11 Drawing Sheets

(51) Int. Cl.
*H02K 5/18* (2006.01)
*H02K 5/22* (2006.01)
*H02K 11/33* (2016.01)

(58) Field of Classification Search
CPC .. H02K 9/02; H02K 9/04; H02K 9/06; H02K 9/14; H02K 11/30; H02K 11/33
See application file for complete search history.

(56) References Cited

U.S. PATENT DOCUMENTS

| | | |
|---|---|---|
| 2005/0023912 A1 | 2/2005 | Lin et al. |
| 2010/0201211 A1 | 8/2010 | Schmidt et al. |
| 2013/0082550 A1 | 4/2013 | Fleming |
| 2014/0354088 A1* | 12/2014 | Kannegaard Andersen ............... F04D 29/026 310/71 |
| 2017/0324300 A1* | 11/2017 | Yamashita ............... H02K 5/24 |
| 2018/0115224 A1 | 4/2018 | Yamashita |
| 2020/0124056 A1 | 4/2020 | Wu et al. |
| 2023/0387751 A1* | 11/2023 | Schunk ............... H02K 7/083 |

FOREIGN PATENT DOCUMENTS

| | | |
|---|---|---|
| CN | 105840527 A | 8/2016 |
| DE | 10 2005 032 968 A1 | 2/2007 |
| DE | 10 2008 028 622 A1 | 12/2009 |
| EP | 1 146 625 A1 | 10/2001 |
| WO | 2017/026128 A1 | 2/2017 |
| WO | WO-2023156150 A1 * | 8/2023 ............. H02K 11/33 |

OTHER PUBLICATIONS

International Search Report and Written Opinion dated Apr. 26, 2022, issued in PCT Application No. PCT/IB2022/050749, filed Jan. 28, 2022.

* cited by examiner

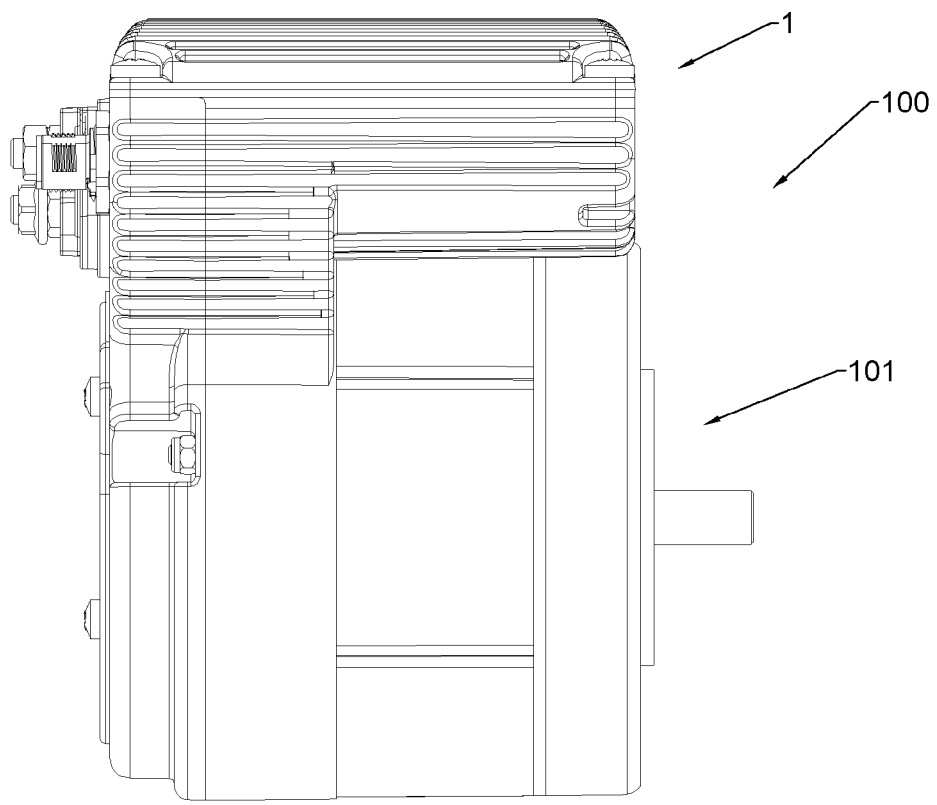
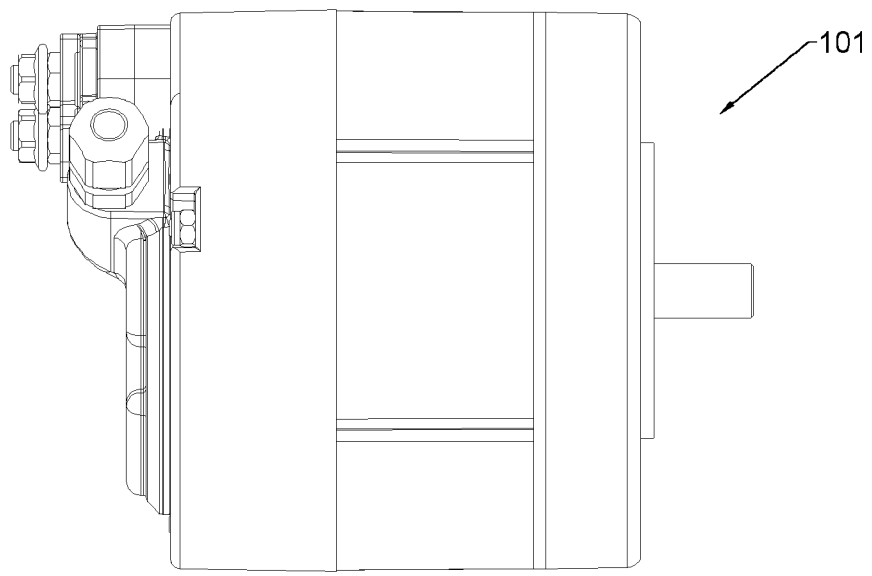
Fig.15

END CAP FOR ELECTRIC MOTORS, AND MOTOR UNIT COMPRISING AN ELECTRIC MOTOR ASSOCIATED WITH SAID END CAP

BACKGROUND OF THE INVENTION

1. The Field of the Invention

The invention relates to an end cap for electric motors, preferably for brushless motors.

Further, the present invention relates to a motor unit comprising an electric motor associated with the above-mentioned end cap.

2. The Relevant Technology

It is well known that motor units of the electric type comprise an electric motor, in particular a brushless motor, which in turn generally includes a containment case for a stator body and a rotor with a motor shaft. In addition, the motor unit generally comprises an output cap with an output for the motor shaft and an end cap, opposite the output cap, on which an electronic control unit for the electric motor is possibly housed.

However, such motor units according to known art, disadvantageously, very often have a non-negligible axial and radial dimension.

Moreover, still disadvantageously, such motor units of the prior art do not allow access to the individual components, in particular the electronic control unit, quickly and easily, in order, for example, to replace them.

In fact, in a first type of motor units of the known type represented in patent document CN104467298 A, the electronic control unit, usually equipped with an encoder, is positioned outside the end cap, inside a protective shroud which extends externally to the cap itself in the axial direction.

Therefore, although this solution allows access to the electronic control unit and easy intervention thereon, without having to disassemble the end cap from the electric motor, it has the disadvantage of significantly increasing the axial dimensions of the entire motor unit.

In a second solution of the prior art represented by patent document CN203251543 A, unlike the one just described, it is envisaged to arrange the electronic control unit in a radially defined housing on the case of the electric motor.

In this case, therefore, the solution involves an increase in the radial dimensions and it also involves an increase in the components that make up the motor unit, since, in addition to the end cap, an element separated from the latter must also be provided to define the housing for the electronic control unit.

Document US 2018/115224 discloses an end cap for electric motors, configured to be associated with one of said electric motors at the axial end opposite the output end of the motor shaft, wherein said end cap comprises, made as a single body, a coupling seat for associating said electric motor in the axial direction and a housing for an electronic control unit; said housing extending from a perimeter portion of said coupling seat, in an axial direction and in the coupling direction of said coupling seat with said electric motor, so that when the electric motor is coupled to the coupling seat, the housing faces the electric motor; the outer surface of the housing having in the central part a concave shape in the radial direction facing downwards towards the containment case of the electric motor so as to follow the course of said containment case of said electric motor.

SUMMARY OF THE INVENTION

The present invention is intended to overcome the aforesaid drawbacks of the prior art.

In particular, a first aim of the invention is the realisation of an end cap for electric motors which enables the axial and radial dimensions of the motor unit in which it is used to be reduced.

A further aim of the invention is the realisation of an end cap for electric motors which makes it easier to assemble the motor units in which such a cap is used.

A further aim of the invention is the realisation of an end cap for electric motors which allows easy and quick access by an operator to its internal components.

In addition, it is the aim of the invention to make an end cap for electric motors that allows high IP protection to be achieved more easily.

It is also an aim of the invention to make an end cap for electric motors which improves the thermal cooling effect of the electrical/electronic components comprising the motor unit in which such cap is used.

It is a further aim of the invention to make an end cap for electric motors of a versatile type.

Last but not least, the aim of the invention is to realise an end cap that makes it possible to reduce the number of components of a motor unit in which it is used.

The above-mentioned aims are achieved with the realisation of an end cap for electric motors, in accordance with the main claim to which reference will be made.

Further characteristics of the end cap are described in the dependent claims.

The motor unit comprising an electric motor and the above-mentioned end cap.

BRIEF DESCRIPTION OF THE DRAWINGS

The aforesaid aims, together with the advantages that will be mentioned hereinafter, will be highlighted during the description of a preferred embodiment of the invention, which is given by way of non-limiting example with reference to the accompanying drawings, where:

FIG. 15 shows a comparison between the footprint of a single electric motor and the footprint of the motor unit of the invention comprising such an electric motor associated with the end cap of the invention;

DETAILED DESCRIPTION OF THE PREFERRED EMBODIMENTS

Figure 1:
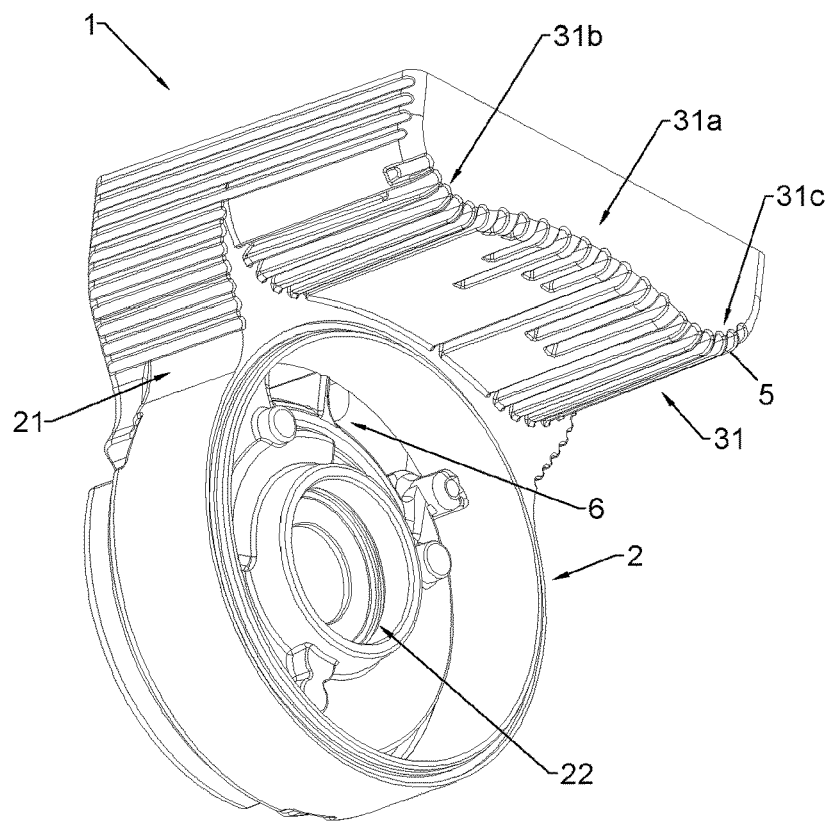
FIG. 1 shows an axonometric view from below of the front part of an end cap of the invention.

The end cap of the invention for electric motors, preferably for brushless motors, is shown in isolation in FIGS. 1 to 9, wherein it is indicated overall by 1, and is shown assembled in a motor unit 100 in FIGS. 10 to 17.

The end cap 1 of the invention is configured to be associated with an electric motor 101 at the axial end 102 thereof, opposite the output end 103 of the motor shaft 104.

According to the invention, in particular, the end cap 1 comprises, made as a single body, a coupling seat 2 for association with said electric motor 101 in the axial direction and a housing 3 for an electronic control unit 105.

Preferably, such end cap 1 is made as a single body by means of a die-casting process. More specifically, such end cap 1 is made of die-cast aluminium.

The central part of the coupling seat 2 has a housing for a slewing bearing 22.

Figure 4:
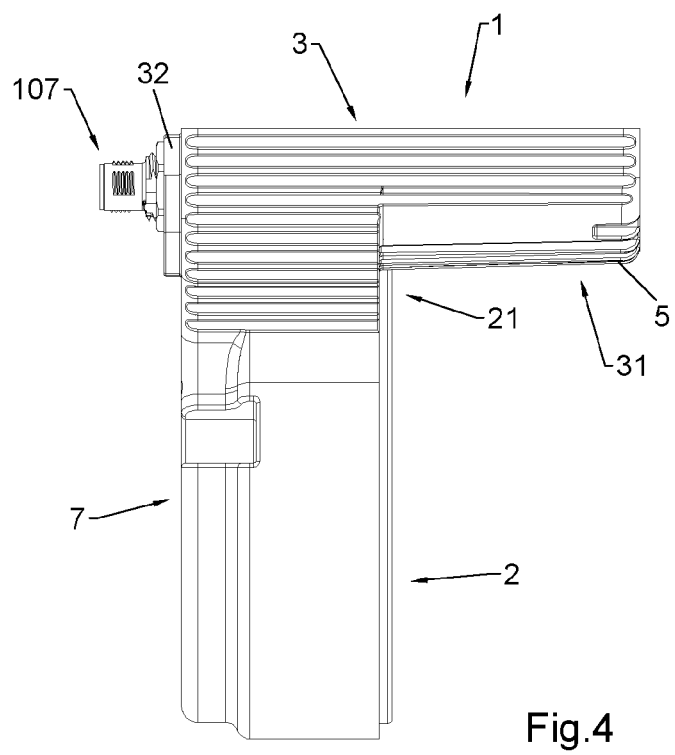
FIG. 4 shows the side view of the end cap of FIG. 1.
Figure 6:
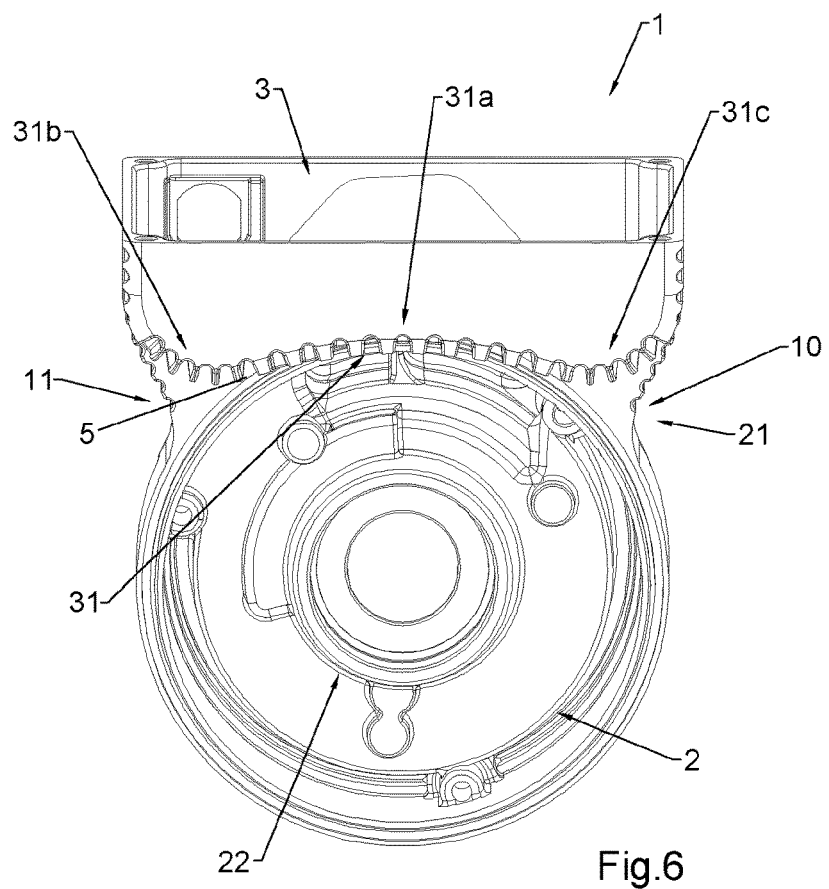
FIG. 6 shows the front view of the end cap of FIG. 1.
Figure 10:
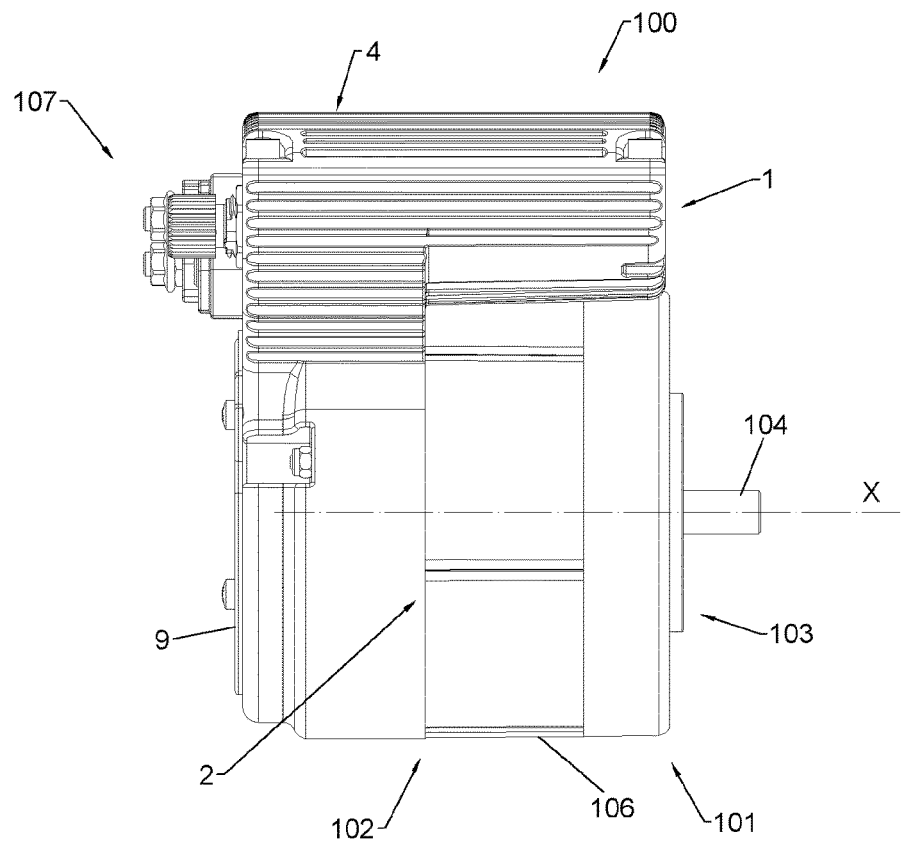
FIG. 10 shows a side view of a first embodiment of a motor unit of the invention.
Figure 14:
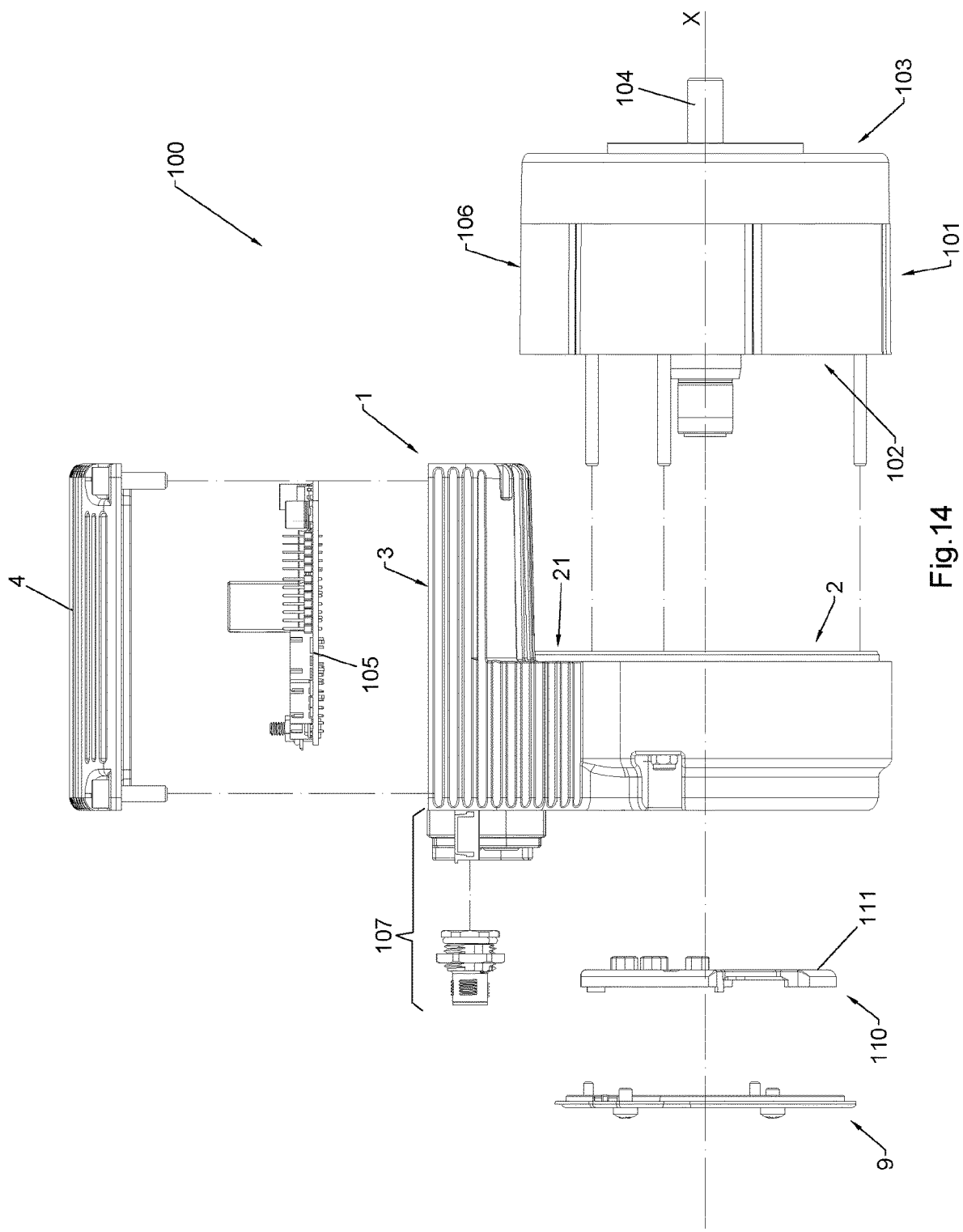
FIG. 14 shows an exploded side view of the motor unit of FIG. 10.

In detail, according to the invention, said housing 3 extends, starting from a perimeter portion 21 of the coupling seat 2, in an axial direction and in the coupling direction of the coupling seat 2 with the electric motor 101, as clearly visible in FIGS. 4, 6 and 14. In other words, this housing 3, when the electric motor 101 is coupled to the aforementioned coupling seat 2, faces the electric motor 101 as shown in FIG. 10.

More specifically, said housing 3 extends, from said perimeter portion 21 of the coupling seat 2, in an axial direction and exclusively in the coupling direction of the coupling seat 2.

In other words, the end cap 1 has the same dimensions both in its portion axially opposite the coupling seat 2, and in correspondence with the radially extending wall 32 delimiting the housing 3, on the opposite side of said coupling seat 2.

This, advantageously, makes it possible to keep the motor unit 100 essentially composed of the aforementioned end cap 1 and of the electric motor 101 extremely compact. In particular, as can be seen in the comparison of FIG. 15, the motor unit 100, comprising the aforementioned end cap 1, substantially has the same dimensions as the electric motor 101.

Figure 16A:
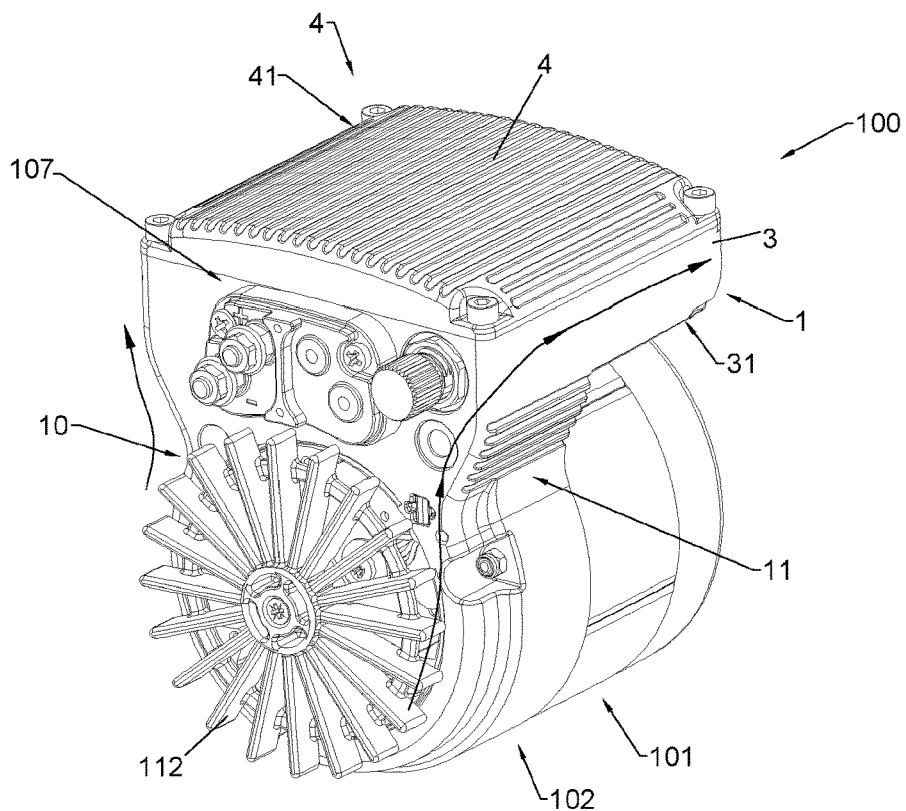
FIGS. 16a and 16b show an axonometric view of a second embodiment of a motor unit of the invention.
Figure 16B:
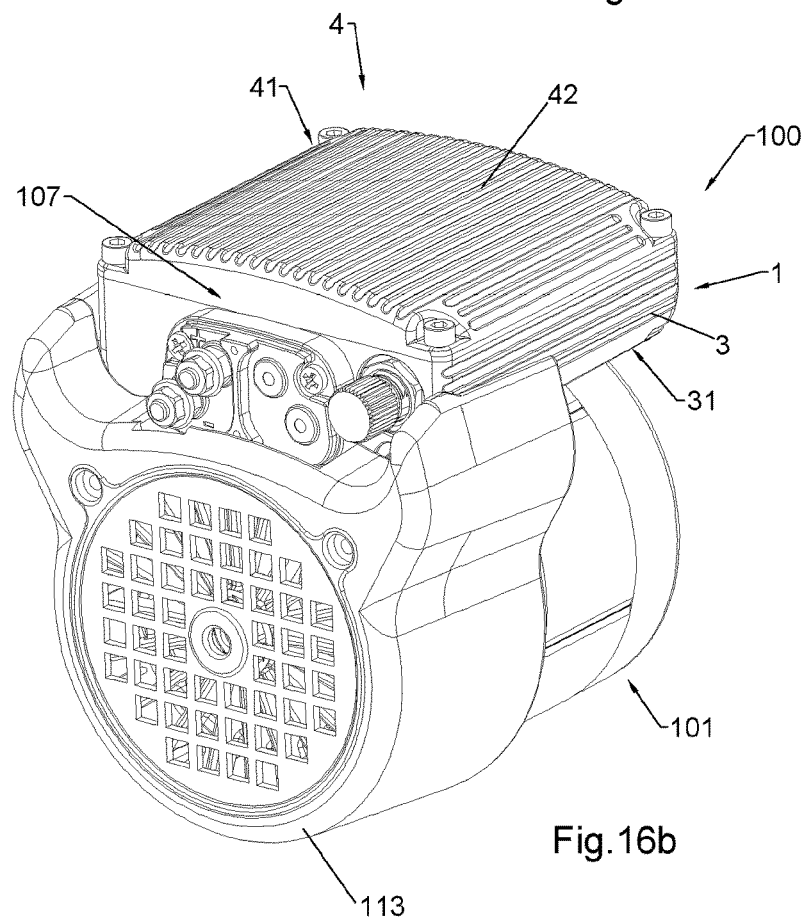
Figure 17:
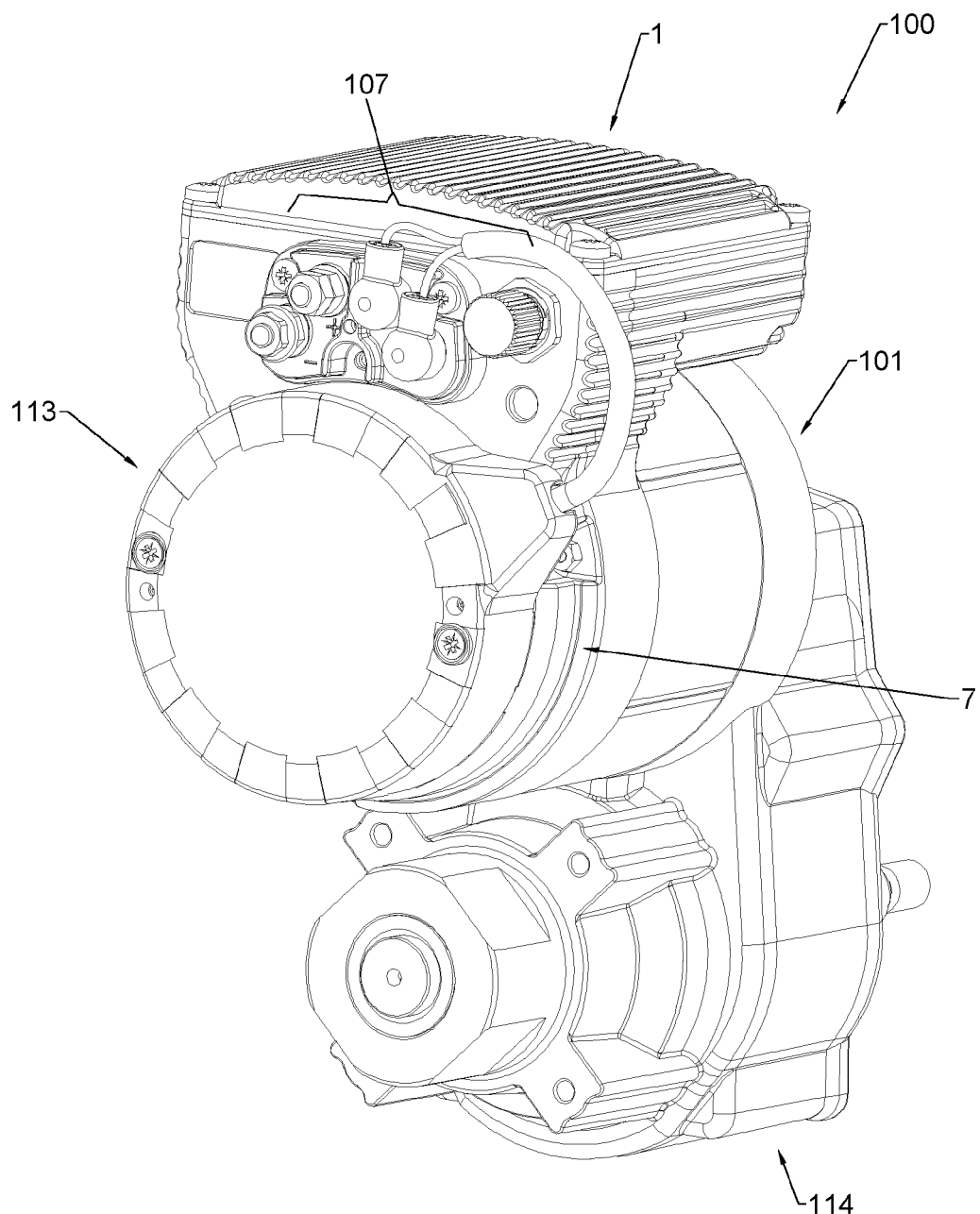
FIG. 17 shows an axonometric view of a third embodiment of a motor unit of the invention.

At the same time, as described in detail below, this makes it possible to use the same end cap 1 also in the event that it is required to equip the motor unit 100 with further functional components, such as, for example, a cooling fan 112, as shown in FIGS. 16a and 16b, or a brake 113, as shown in FIG. 17, which can be associated on the same end cap 1 on the opposite side of the aforesaid coupling seat 2.

In particular, the end cap 1 provides for not defining within it an area in which to place such external functional components, but the end cap 1 itself is configured to associate the aforementioned external components to the rear of said coupling seat 2, in particular, as will be seen shortly, at the edge of a containment recess 7.

Figure 7:
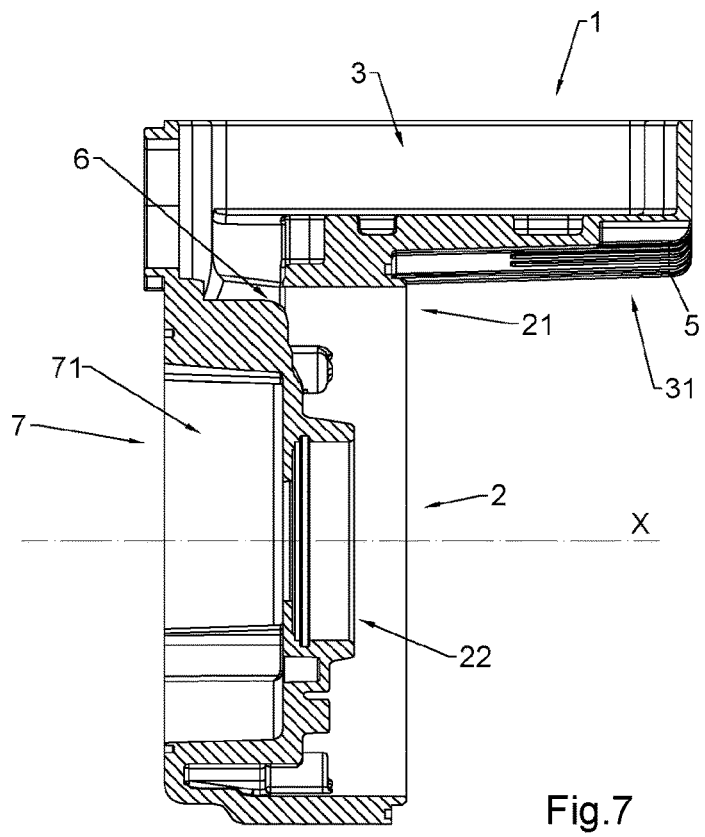
FIG. 7 shows the sectioned side view of the end cap of FIG. 1.

As can be seen in FIG. 7, this housing 3 is accessible in a radial direction, on the opposite side of the aforesaid coupling seat 2.

It is not excluded, however, that according to an alternative embodiment of the invention such a housing 3 is also accessible in the axial direction. This set of features of the end cap 1 advantageously allows a motor unit 100 to be defined with a limited number of components and also allows the overall dimensions of the motor unit 100 itself to be reduced.

Furthermore, this set of features of the end cap 1 of the invention allows for a high degree of integration of the components, in particular the electronic control unit 105, which will form the motor unit 100, in which the same end cap 1 is used.

Further, still advantageously, such a set of features of the end cap 1 allows easy access, by an operator, to its internal components, in particular it allows easy installation of the electronic control unit 105 and, if necessary, easy intervention thereon without having to disassociate the same end cap 1 from the electric motor 101.

In addition, this set of features of the end cap 1 makes it possible to easily and quickly retrofit either an end cap associated with a stand-alone electric motor, i.e., without an electronic control unit, or an end cap associated with such an electric motor, equipped with obsolete electronic control components and therefore that need to be replaced. In particular, the specific shaping of the end cap 1, together with the fact that said end cap 1 provides for the integration of the electronic control unit 105 for an electric motor 101, make it possible to upgrade said electronic control components of the electric motor 101 by simply associating in an axial direction, at the coupling seat 2, the end cap 1 with an electric motor 101, previously equipped with obsolete electronic control components.

Figure 3A:
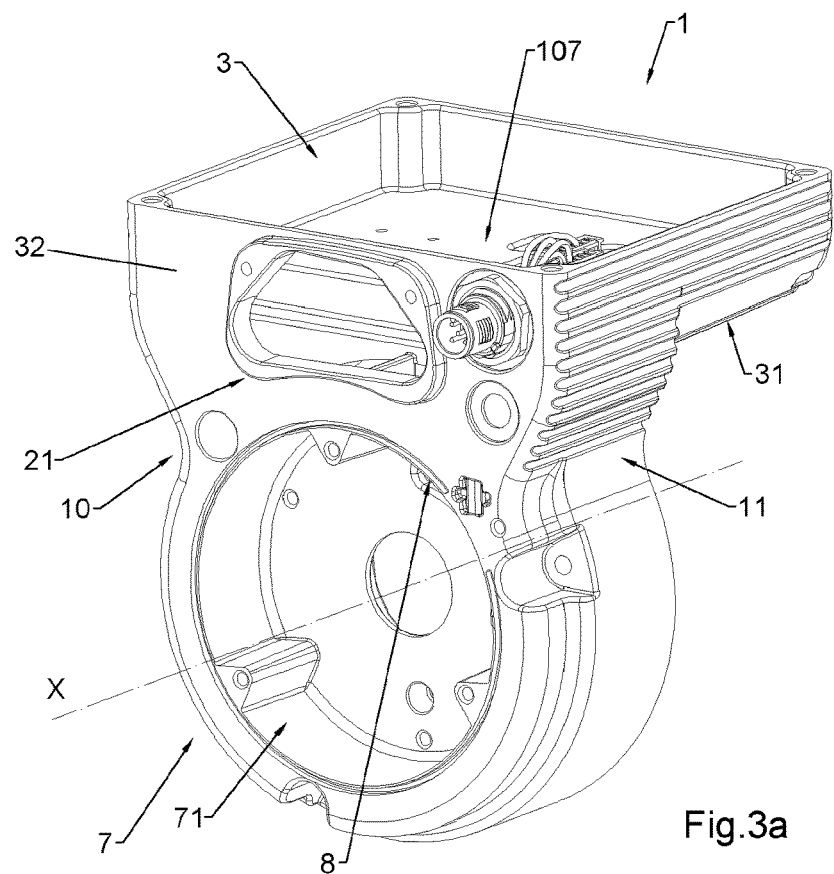
FIG. 3a shows an axonometric view of the rear part of the end cap of FIG. 1.

As observed in FIG. 3a, an electrical/electronic connection assembly 107, comprising at least one electrical/electronic connector and/or at least one terminal block, is provided, defined on the radially extending wall 32 delimiting the housing 3, on the opposite side of the coupling seat 2.

In particular, this electrical/electronic connection assembly 107 is preferably, but not necessarily, oriented in the axial direction.

Figure 8:
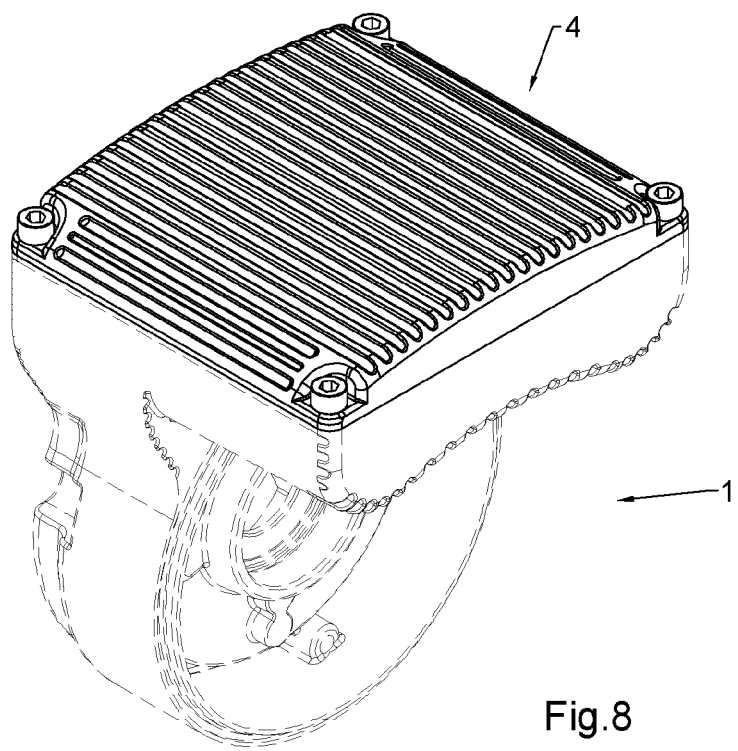
FIG. 8 shows an axonometric view of a first closing element which can be applied at the housing of the end cap of FIG. 1.

As can be seen in FIG. 8, the end cap 1 further comprises a first closing element 4, which can be reversibly coupled to the housing 3 and in proximity to the same to prevent access thereto. Conversely, once this first closing element 4 has been disassociated from the single body of the end cap 1, as indicated above, it is possible to access the housing 3 in a radial direction.

Preferably, the contact surfaces of the first closing element 4 and the housing 3 for their coupling are flat surfaces, so that they can be easily closed with a gasket and thus achieve increased IP protection.

Furthermore, according to the preferred embodiment of the invention, said first closing element 4 is made of metal material, and on its outer surface 41 there is a plurality of cooling fins 42 to promote the thermal dissipation of the heat generated by the electronic control unit 105 arranged within the housing 3.

However, it is not excluded that, according to different embodiments of the invention, such first closing element 4 may be made of another material, for example plastic, provided that it is capable of appropriately dissipating the thermal energy generated by the electronic control unit 105 arranged in said housing 3.

Preferably, but not necessarily, the housing 3, in addition to being configured to accommodate said electronic control unit 105, also has fastening means configured for fastening said electronic control unit 105 to the bottom of such housing 3.

Even more preferably, such fastening means are threaded holes made in the bottom of said housing 3, used to fasten the electronic control unit 105 by means of screws.

Figure 2:
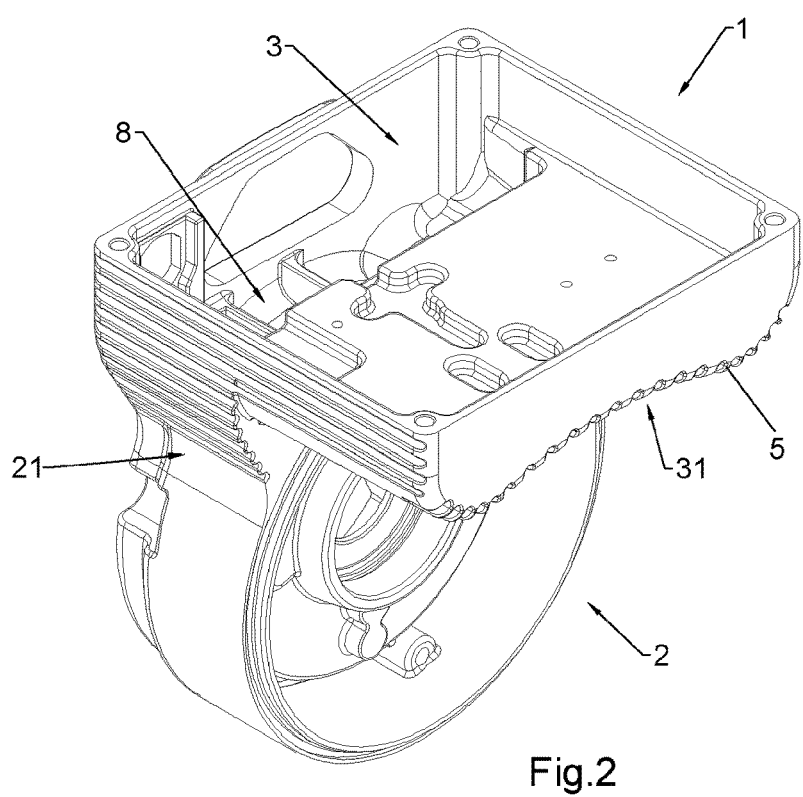
FIG. 2 shows an axonometric view from above of the front part of the end cap of FIG. 1.
Figure 3B:
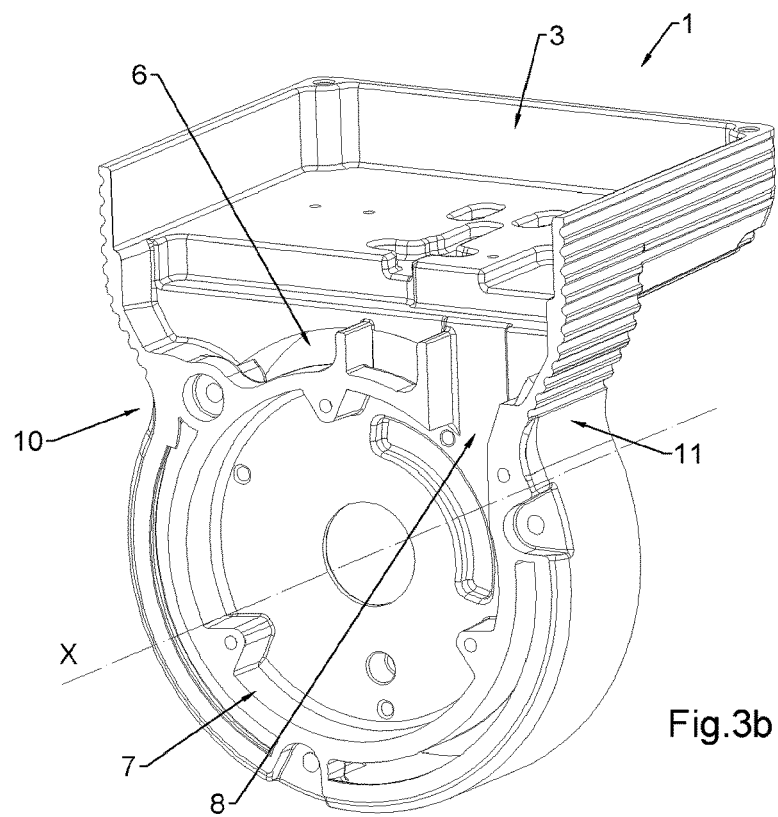
FIG. 3b shows the axonometric view of FIG. 3a sectioned in a section plane orthogonal to the axis X.

As can be seen in FIGS. 2 and 3b, the bottom of the housing 3 is defined as substantially continuous and planar in such a way as, advantageously, to allow direct and extensive contact with the bottom of the electronic control unit 105 located within the housing 3 itself. This further optimises the dissipation of the heat generated by the electronic control unit 105 itself.

It is not excluded, however, that according to an alternative embodiment such fastening means are made on the inner wall of the first closing element 4, which is adapted to face the housing 3 when the same closing element 4 is placed in the closure of the latter.

The fact that the electronic control unit 105 can be fastened to said inner wall of the first closing element 4 facilitates the dissipation of the thermal energy generated by the electronic control unit 105 itself.

According to the preferred embodiment of the invention, the outer surface 31 of the housing 3, adapted to face the electric motor 101 when the latter is associated with the coupling seat 2, has a concave shaping in the radial direction. This advantageously allows a compact structure of the motor unit 100 to be maintained, comprising at least said electric motor 101 and the end cap 1 of the invention.

In particular, said outer surface 31 of the housing 3 is shaped in such a way as to be distanced from the containment case 106 of the electric motor 101, thus not coming into contact with said containment case when the same electric motor 101 is coupled to the coupling seat 2 of the end cap 1.

In particular, preferably but not necessarily, said spacing between said outer surface 31 and the containment case 106 is comprised between 1 and 30 mm.

Further, as can be seen in FIG. 1, this outer surface 31 of the housing 3, adapted to face the electric motor 101, spaced apart from the same and thus not in contact with such electric motor when the latter is associated with the seat, has a plurality of cooling fins 5. This feature allows the structure of the housing 3 to be used as a heat sink for the heat generated by the electronic control unit 105 and by the electric motor 101, as well as allowing the internal arrangement of the electronic control unit itself.

Figure 12:
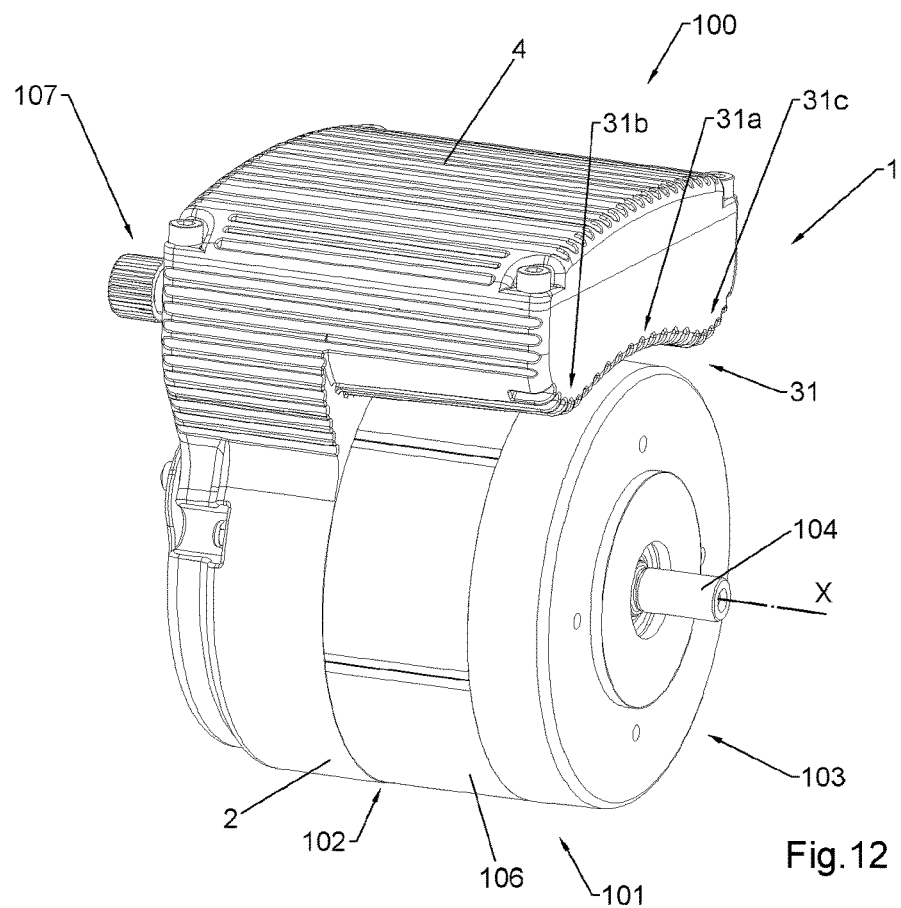
FIG. 12 shows an axonometric view of the front part of the motor unit of FIG. 10.
Figure 13:
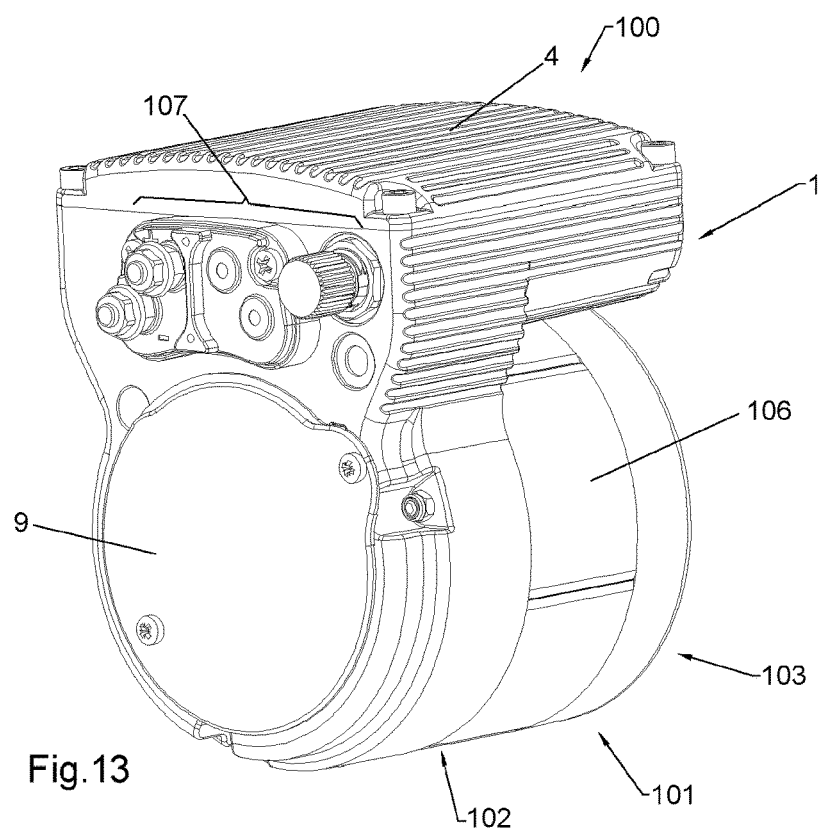
FIG. 13 shows an axonometric view of the rear part of the motor unit of FIG. 10.

More precisely, according to the preferred embodiment of the invention, as can be clearly observed in FIGS. 6 and 12, such outer surface 31 has in the central part 31a said concavity facing downwards, i.e., towards the containment case 106 of the electric motor 101, so as to follow the course of such containment case 106 and optimise heat dissipation. At the same time, said outer surface 31 exhibits, in correspondence with both lateral parts 31b and 31c, a concavity facing upwards; therefore, such lateral parts 31b and 31c of the outer surface 31 exhibit a downwards convexity.

On the one hand, such particular shaping of the outer surface 31 advantageously allows, as mentioned above, to optimise, in correspondence with its central part 31a, a heat exchange effect of the heat generated by the electric motor 101 and by the electronic control unit 105, and on the other hand, the concavities facing upwards, made in correspondence with the lateral parts 31b and 31c of such outer surface 31, allow the size of the same outer surface 31 to be increased and also the circulation of air flows around the latter to be promoted, further maximising heat dispersion.

Such optimisation of the heat exchange of the heat generated by the electronic control unit 105, as mentioned above, as well as being obtained thanks to the particular shaping of the outer surface 31, is also achieved thanks to the fact that the electronic control unit 105 itself results in direct and extended contact with the bottom of the housing 3. In other words, the bottom and the outer surface 31 of the housing 3 act as a real dissipating device in relation to the electronic control unit 105.

Figure 5:
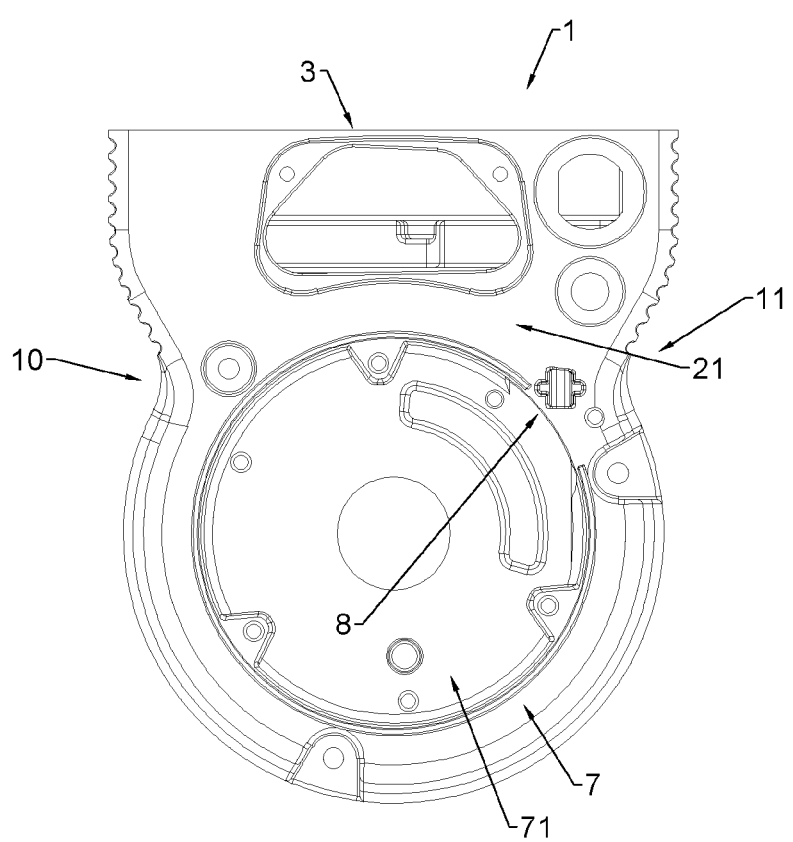
FIG. 5 shows the rear view of the end cap of FIG. 1.

Further, as can be seen in FIGS. 5 and 6, the housing 3 in correspondence with the section extending from the perimeter portion 21 of the coupling seat 2 presents on both sides two curvilinear areas 10 and 11 recessed with respect to the width presented by the same housing 3 in the section extending in the axial direction and in the coupling direction of the coupling seat 2.

As will be described below, said two recessed curvilinear areas 10 and 11, in case a cooling fan 112 is provided in correspondence with the rear part of the end cap 1, advantageously allow the flow of cooling air towards said outer surface 31 to be promoted, further optimising the thermal dissipation of the heat produced both by the electric motor 101 and by the electronic control unit 105.

In order to electrically/electronically connect the electronic control unit 105 to the electric motor 101, in order to control the latter, the end cap 1 provides a first internal communication channel 6 between the housing 3 and the area in which the aforementioned coupling seat 2 is defined, as can be seen in FIG. 3b and in FIG. 7.

According to the preferred embodiment of the invention, as mentioned above, preferably but not necessarily, the end cap 1 further has a containment recess 7 defined to curve inwards in the axial direction on the opposite side of the coupling seat 2.

In particular, such containment recess 7 is defined by a cavity 71 with a circular profile which extends in an axial direction towards the coupling seat 2.

Advantageously, the presence of the aforementioned containment recess 7 allows the insertion, within the footprint of the end cap 1, of an encoder 110 coaxially to the axis X of the motor shaft 104 of the electric motor 101. Preferably, such an encoder 110 is a Hall sensor 111.

Still advantageously, the fact that the encoder 110 is arranged within the aforementioned recessed containment recess 7 allows an operator to access it easily, without the need to disassemble the end cap 1 from the electric motor 101.

Also in this case, as represented in FIG. 3b, it is envisaged to define a second internal communication channel 8 between the housing 3 and the containment recess 7, so as to be able to electronically connect said encoder 110 with the electronic control unit 105.

Figure 9:
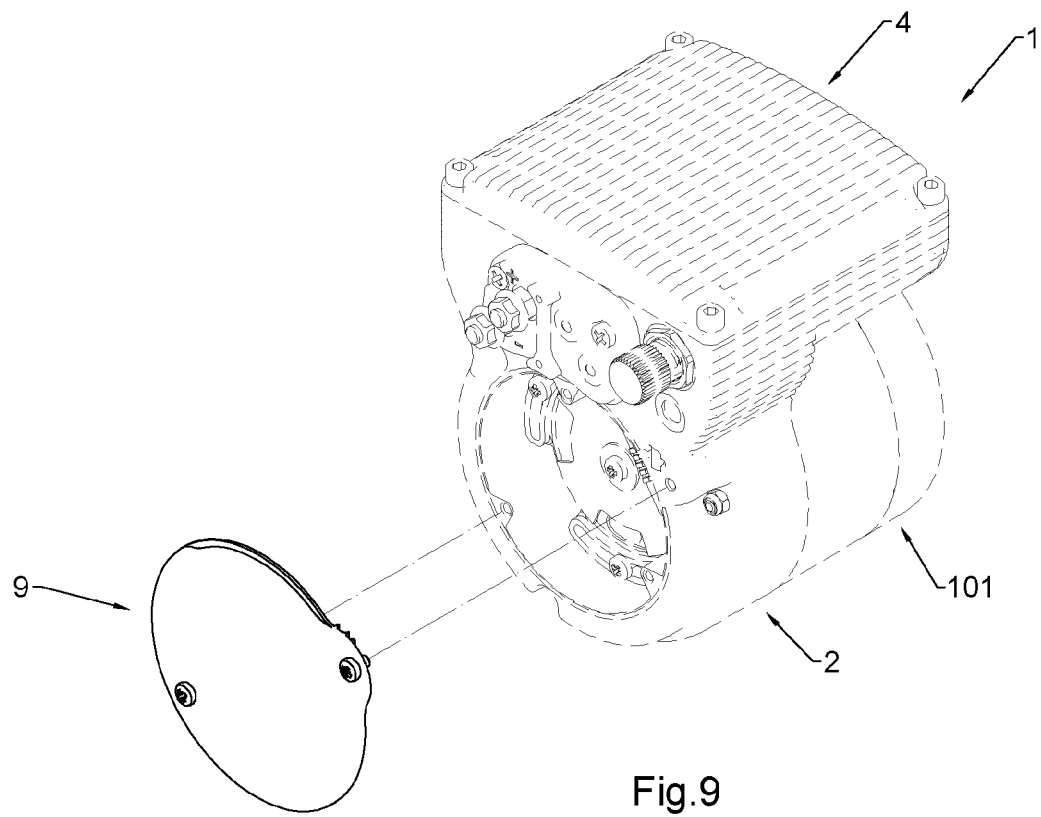
FIG. 9 shows an axonometric view of a second closing element that can be fitted in the containment recess of the end cap of FIG. 1.

Further, according to the preferred embodiment of the invention, as represented in FIG. 9, a second closing element 9 of substantially discoidal shape is provided, which can be reversibly coupled to the containment recess 7 and in proximity to the same in order to prevent access thereto.

As mentioned above, the motor unit 100 is also part of the invention, a first preferred embodiment of which is shown in FIGS. 10 to 14. Said motor unit 100 comprises an electric motor 101, in particular a brushless motor, provided with a containment case 106 for a stator body and a rotor, not shown in the figures, with a motor shaft 104 and an electronic control unit 105 configured to control said electric motor 101.

Figure 11:
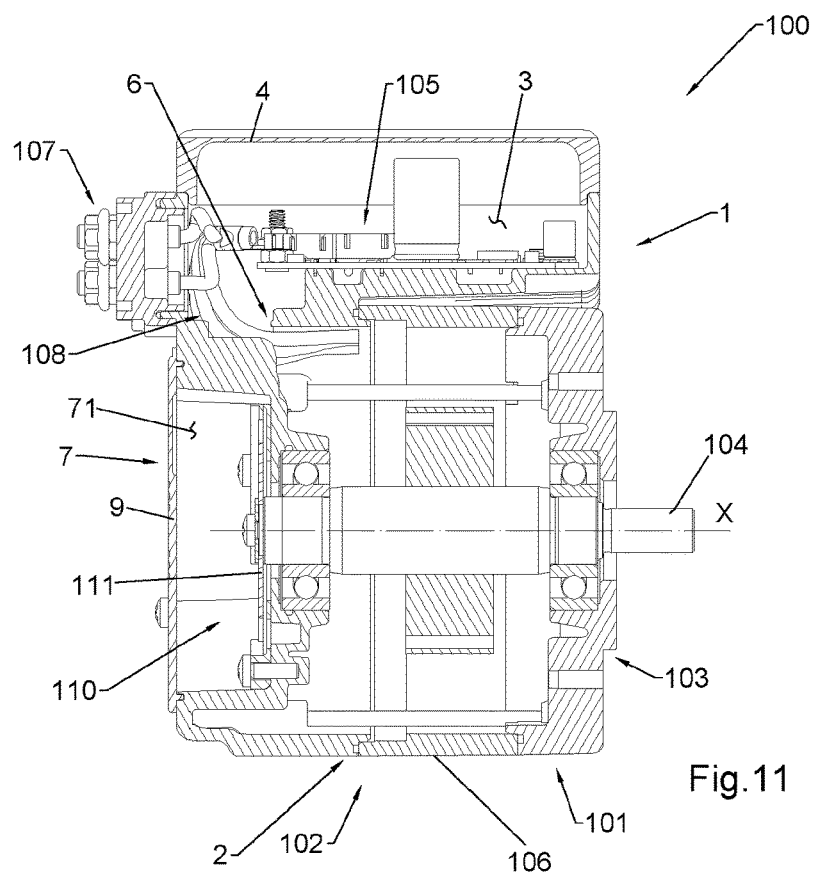
FIG. 11 shows a sectioned side view of the motor unit of FIG. 10.

According to the invention, the motor unit 100 also comprises an end cap 1 of the invention, the features of which have been described above. Such end cap 1 is associated with the coupling seat 2 thereof with the electric motor 101, at the axial end 102 of the latter, opposite the output end 103 of the motor shaft 104. The electronic control unit 105, as shown in FIG. 11, is inserted in the housing 3 of the same end cap 1. Furthermore, the motor unit 100 of the invention provides a first electrical/electronic connection 108 between the electronic control unit 105 and the electric motor 101, via the first internal communication channel 6.

According to the preferred embodiment of the motor unit 100 of the invention, an encoder 110 is also located within the containment recess 7.

In this case, there is also a second electrical/electronic connection, not visible in the figures, between the aforesaid encoder 110 and the electronic control unit 105 via the second internal communication channel 8.

A second preferred embodiment of the motor unit 100 of the invention is depicted in FIGS. 16a and 16b.

This second embodiment of the motor unit 100 includes all the features described for the first embodiment represented by FIG. 10 to FIG. 14, except that, instead of including the second closing element 9 arranged to close the containment recess 7, it provides for the installation of a cooling fan 112, behind said containment recess 7, as represented in FIG. 16a, and of a protective shroud 113 arranged externally to such cooling fan 112, as shown in FIG. 16b.

In particular, the cooling fan 112 is directly fitted onto the motor shaft 104 and turns solidly constrained to the electric motor 101.

It is well known that, in certain applications where it is necessary to increase the flow of cooling air to allow, in general, the correct functioning of the motor units, an auxiliary fan is installed on the same motor units in order to generate this flow of cooling air.

In the case of the motor unit 100 of the invention, according to the preferred embodiment depicted in FIGS. 16a and 16b, advantageously the distinctive shaping of the end cap 1 of the invention, in particular the presence of the aforementioned two recessed curvilinear areas 10 and 11, and, moreover, the proximity of the housing 3 with respect to the cooling fan 112, allow to direct part of the cooling air flow generated by the same fan 112 towards the outer surface 31, as well as towards the lateral surfaces of the same housing 3, as represented by the arrows of FIG. 16a.

Consequently, such cooling air flow is advantageously able to increase and speed up the heat exchange between the internal high-temperature part of the housing 3, due to the heat generated by the electronic control unit 105, and the cooling air flow itself.

This further aspect thus makes it possible to ensure greater stability and constancy of operation of the entire motor unit 100 of the invention compared to motor units of the prior art.

Further, in place of the cooling fan 112, for a third embodiment of the motor unit 100 of the invention, shown in FIG. 17, a brake 113 electrically connected to the same electronic control unit 105, could be associated with the end cap 1, to the rear of the aforesaid containment recess 7, by means of a connector or a terminal board at said wall 32. This means that, even when such a brake 113 is installed, the IP degree of protection provided by the end cap 1 of the invention is maintained unchanged.

A further advantageous aspect of the end cap 1 of the invention consists of the fact that it has a great degree of versatility, in the sense that its size and shape remain unchanged regardless of whether a cooling fan 112 and/or a brake 113 is associated with it at the rear, or whether said containment recess 7 is closed with the second closing element 9 of substantially discoidal shape.

In other words, the aforesaid end cap 1 is, on the one hand, configured in order to be able to associate an external functional element therewith, such as a cooling fan 112 or a brake 113, and on the other hand it is defined in such a way as to have minimal dimensions in case it is not associated with any external functional element, as is clearly observed in FIG. 15.

By way of non-limiting example, the motor unit 100 of the invention is configured to be operatively connected, with its motor shaft 104, to a gearbox assembly 114, as depicted for example in FIG. 17, so as to define a gearmotor for implementing a traction system of an electric vehicle.

It is not excluded, however, that such a motor unit of the invention may be used in applications other than the one just exemplified.

According to the foregoing, the end cap 1 of the invention and the motor unit 100 achieve all the above-mentioned purposes.

A first aim achieved by the invention is the realisation of an end cap for electric motors which enables the axial and radial dimensions of the motor unit in which it is used to be reduced.

A further aim achieved by the invention is the realisation of an end cap for electric motors which allows easy access by an operator to its internal components.

Another aim reached by the invention is the realisation of an end cap for electric motors which makes it easier to assemble the motor units in which such a cap is used.

In addition, the aim of making an end cap for electric motors that allows high IP protection to be obtained more easily is also achieved.

Moreover, the aim of making an end cap for electric motors which improves the thermal cooling effect of the electrical/electronic components comprising the motor unit in which such cap is used is also achieved.

The aim of making a versatile end cap for electric motors is also achieved.

Last but not least, the aim of the invention to realise an end cap that makes it possible to reduce the number of components of a motor unit in which it is used is achieved.

The invention claimed is:

1. An end cap for an electric motor configured to be associated with said electric motor at an axial end opposite an output end of a motor shaft of the electric motor, wherein said end cap comprises, made as a single body:
    a coupling seat for associating said electric motor in an axial direction;
    a housing for an electronic control unit, said housing extending from a perimeter portion of said coupling seat, in the axial direction and in a coupling direction of said coupling seat with said electric motor so that when said electric motor is coupled to said coupling seat said housing faces said electric motor, an outer surface of said housing having in a central part a concave shape in a radial direction facing downwards towards a containment case of said electric motor so as to follow the course of the containment case of said electric motor;

wherein said outer surface of said housing is configured in such a way that, when said end cap is associated with said electric motor, it is spaced from said containment case of said electric motor, said spacing being comprised between 1 and 30 mm, said outer surface having two lateral parts on either side of the central part, said outer surface exhibiting, in correspondence with both lateral parts thereof, a concavity facing upwards so as to increase the size of said outer surface and promote the circulation of air flows around said outer surface;

said housing including a section extending in the radial direction from said perimeter portion of said coupling seat and a section extending in the axial direction, said housing including, in correspondence with the section extending in the radial direction from said perimeter portion of said coupling seat, having on each side one curvilinear area recessed with respect to a width presented by said housing in correspondence with the section extending in the axial direction.

2. The end cap according to claim 1, wherein said outer surface of said housing, adapted to face said electric motor when associated with said coupling seat, has a plurality of cooling fins.

3. The end cap according to claim 1, wherein the end cap is made as a single body of die-cast aluminum.

4. The end cap according to claim 1, wherein said electronic control unit disposed internally to said housing is accessible at least in the radial direction.

5. The end cap according to claim 1, wherein said electronic control unit disposed internally to said housing is accessible at least in the axial direction.

6. The end cap according to claim 1, wherein a first closing element is provided, which can be reversibly coupled to said housing and in proximity to the same to prevent access thereto.

7. The end cap according to claim 6, wherein said first closing element has on its outer surface a plurality of cooling fins.

8. The end cap according to claim 6, wherein contact surfaces of said first closing element and of said housing for the coupling thereof are flat surfaces, so as to facilitate relative closure with a gasket.

9. The end cap according to claim 1, further comprising an electrical/electronic connection assembly, comprising at least one electrical/electronic connector and/or a terminal block and being defined on a radially extending wall delimiting said housing, on the opposite side of said coupling seat, said electrical/electronic connection assembly preferably being oriented in the axial direction.

10. The end cap according to claim 1, wherein a bottom of said housing is defined as substantially continuous and planar in such a way as to allow direct and extensive contact between said bottom and said electronic control unit placed inside said housing.

11. The end cap according to claim 1, further comprising a first internal communication channel between said housing and the area in which said coupling seat is defined.

12. The end cap according to claim 1, further comprising a containment recess defined to curve inwards in the axial direction on the opposite side of the electric motor of said coupling seat.

13. The end cap according to claim 12, wherein said containment recess is defined by a cavity with a circular profile which extends in an axial direction towards said coupling seat.

14. The end cap according to claim 12, further comprising a second internal communication channel between said housing and said containment recess.

15. The end cap according to claim 12, further comprising a second closing element of substantially discoidal shape that can be reversibly coupled with said containment recess and in proximity to the same to prevent access thereto.

16. A motor unit comprising:
an electric motor provided with a containment case for a stator body and a rotor with a motor shaft;
electronic control unit configured to control said electric motor; and
an end cap,
said end cap being associated with said electric motor at an axial end opposite an output end of the motor shaft,
wherein said end cap comprises, made as a single body:
a coupling seat for associating said electric motor in an axial direction;
a housing for the electronic control unit, said electronic control unit being inserted into said housing, said housing extending from a perimeter portion of said coupling seat, in the axial direction and in a coupling direction of said coupling seat with said electric motor so that when said electric motor is coupled to said coupling seat said housing faces said electric motor, an outer surface of said housing having in a central part a concave shape in a radial direction facing downwards towards the containment case of said electric motor so as to follow the course of the containment case of said electric motor;
wherein said outer surface of said housing is configured in such a way that, when said end cap is associated with said electric motor, it is spaced from said containment case of said electric motor, said spacing being comprised between 1 and 30 mm, said outer surface having two lateral parts on either side of the central part, said outer surface exhibiting, in correspondence with both lateral parts thereof, a concavity facing upwards so as to increase the size of said outer surface and promote the circulation of air flows around said outer surface;
said housing including a section extending in the radial direction from said perimeter portion of said coupling seat and a section extending in the axial direction, said housing including, in correspondence with the section extending in the radial direction from said perimeter portion of said coupling seat, having on each side one curvilinear area recessed with respect to a width presented by said housing in correspondence with the section extending in the axial direction.

17. A motor unit comprising:
an electric motor provided with a containment case for a stator body and a rotor with a motor shaft;
electronic control unit configured to control said electric motor; and
an end cap,
said end cap being associated with said electric motor at an axial end opposite an output end of the motor shaft;
wherein said end cap comprises, made as a single body:
a coupling seat for associating said electric motor in an axial direction;
a housing for the electronic control unit, said electronic control unit being inserted into said housing, said housing extending from a perimeter portion of said coupling seat, in the axial direction and in a coupling direction of said coupling seat with said electric motor so that when said electric motor is coupled to said coupling seat said housing faces said electric motor, an outer surface of said housing having in a central part a concave shape in a radial direction facing downwards towards the containment case of said electric motor so as to follow the course of the containment case of said electric motor;

a containment recess defined to curve inwards in the axial direction on the opposite side of the electric motor of said coupling seat, wherein the motor unit provides for reversibly installing a cooling fan or a brake at the rear of said containment recess;

wherein said outer surface of said housing is configured in such a way that, when said end cap is associated with said electric motor, it is spaced from said containment case of said electric motor, said spacing being comprised between 1 and 30 mm, said outer surface having two lateral parts on either side of the central part, said outer surface exhibiting, in correspondence with both lateral parts thereof, a concavity facing upwards so as to increase the size of said outer surface and promote the circulation of air flows around said outer surface;

said housing including a section extending in the radial direction from said perimeter portion of said coupling seat and a section extending in the axial direction, said housing including, in correspondence with the section extending in the radial direction from said perimeter portion of said coupling seat, having on each side one curvilinear area recessed with respect to a width presented by said housing in correspondence with the section extending in the axial direction.

* * * * *